No. 880,843. PATENTED MAR. 3, 1908.
L. E. WATERMAN.
DISK HARROW.
APPLICATION FILED NOV. 7, 1907.
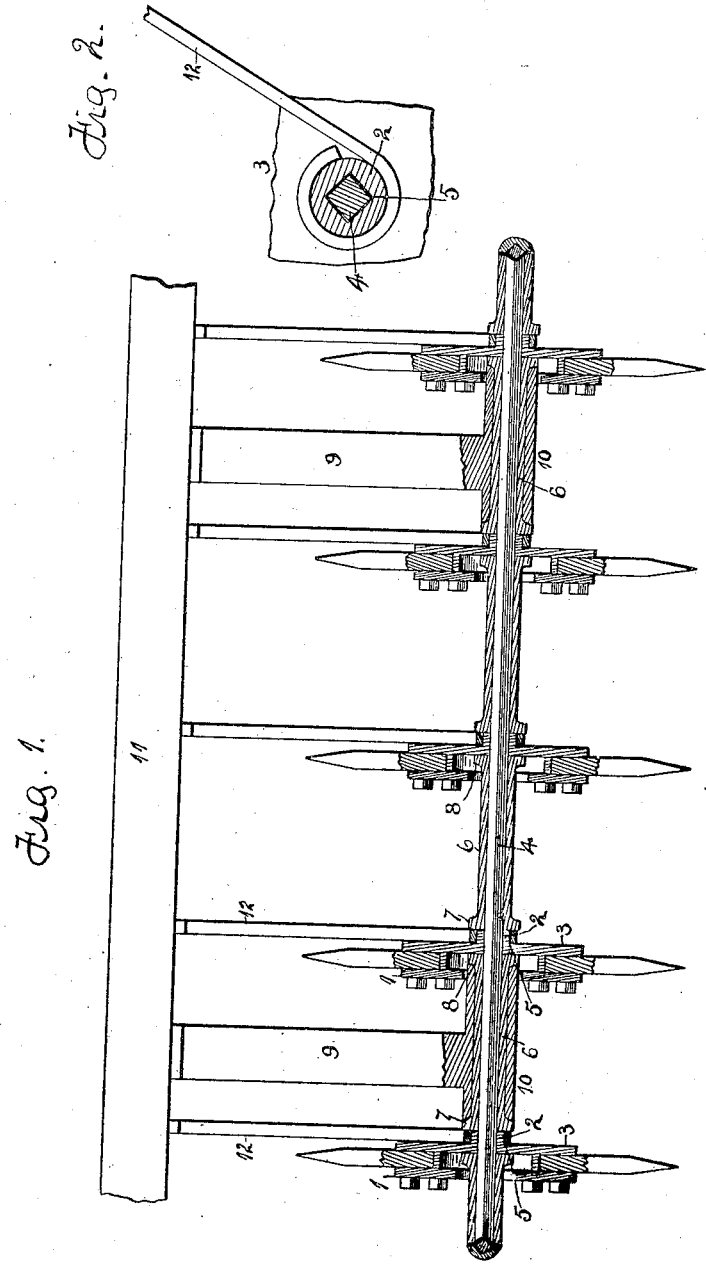
Witnesses:
C. B. Clark
E. Behel
Inventor:
Lewis E. Waterman
By A. O. Behel
Atty.
THE NORRIS PETERS CO., WASHINGTON, D. C.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

DISK HARROW.

No. 880,843.     Specification of Letters Patent.     Patented March 3, 1908.

Original application filed February 19, 1907, Serial No. 358,211. Divided and this application filed November 7, 1907. Serial No. 401,087.

*To all whom it may concern:*

Be it known that I, LEWIS E. WATERMAN, a citizen of the United States, residing at Rockford, in the county of Winnebago, Illinois, have invented certain new and useful Improvements in Disk Harrows, of which the following is a specification.

The object of this invention is to form the support for the teeth with a tubular extension around which is placed one end of a scraper, and a spool located between two disks, one end of which holds the end of the scraper from movement in the lengthwise direction of the gang.

In the accompanying drawings. Figure 1 is a lengthwise vertical section through some of the disks of a gang, the main frame and some other parts not being sectioned. Fig. 2 is a partial face view of the main portion of the disk, and the connection of a scraper with the tubular portion extending from the disk.

Each of the disks 1 have a tubular hub 2 extending from the face plate 3. In forming up a gang of the disks a rectangular rod 4 is placed in the rectangular opening 5 of each disk. Between two disks on the rod 4 is located a spool 6 having enlarged heads 7 and 8. The head 7 of a spool rests in contact with the end of the hub 2 of a disk, and the other head 8 rests in contact with the inner face of the plate 3 as shown at Fig. 1. The brackets 9 have their lower ends 10 in box form and each receives a spool. These brackets serve to support the main frame 11 of the gang and serve to hold the rectangular rod 4 in proper alinement to connect all the disks of a gang.

To the main frame 11 are connected scrapers 12 one for each disk. The lower end of each scraper is located around the hub 2 of a disk, and against the plate 3 of the disk and the end 7 of a spool 6, which serves to hold the scraper from movement in the lengthwise direction of the gang, that is, the scraper is held in proper relation with the disk to throw off any accumulations that may be picked up by the teeth.

I claim as my invention.

A harrow section comprising a main frame, a rod, brackets connected to the frame and to the rod, a series of disks having the rod located in their axial center and having a hub extending therefrom, a series of spools, one located between two disks one end of a spool resting in contact with the hub of a disk, and a scraper for each disk having one end encircling the hub of a disk and held against displacement by the end of the spool.

In testimony whereof I have hereunto set my hand in presence of two subscribing witnesses.

LEWIS E. WATERMAN.

Witnesses:
   A. O. BEHEL,
   E. D. E. N. BEHEL.